Figures 1, 2:
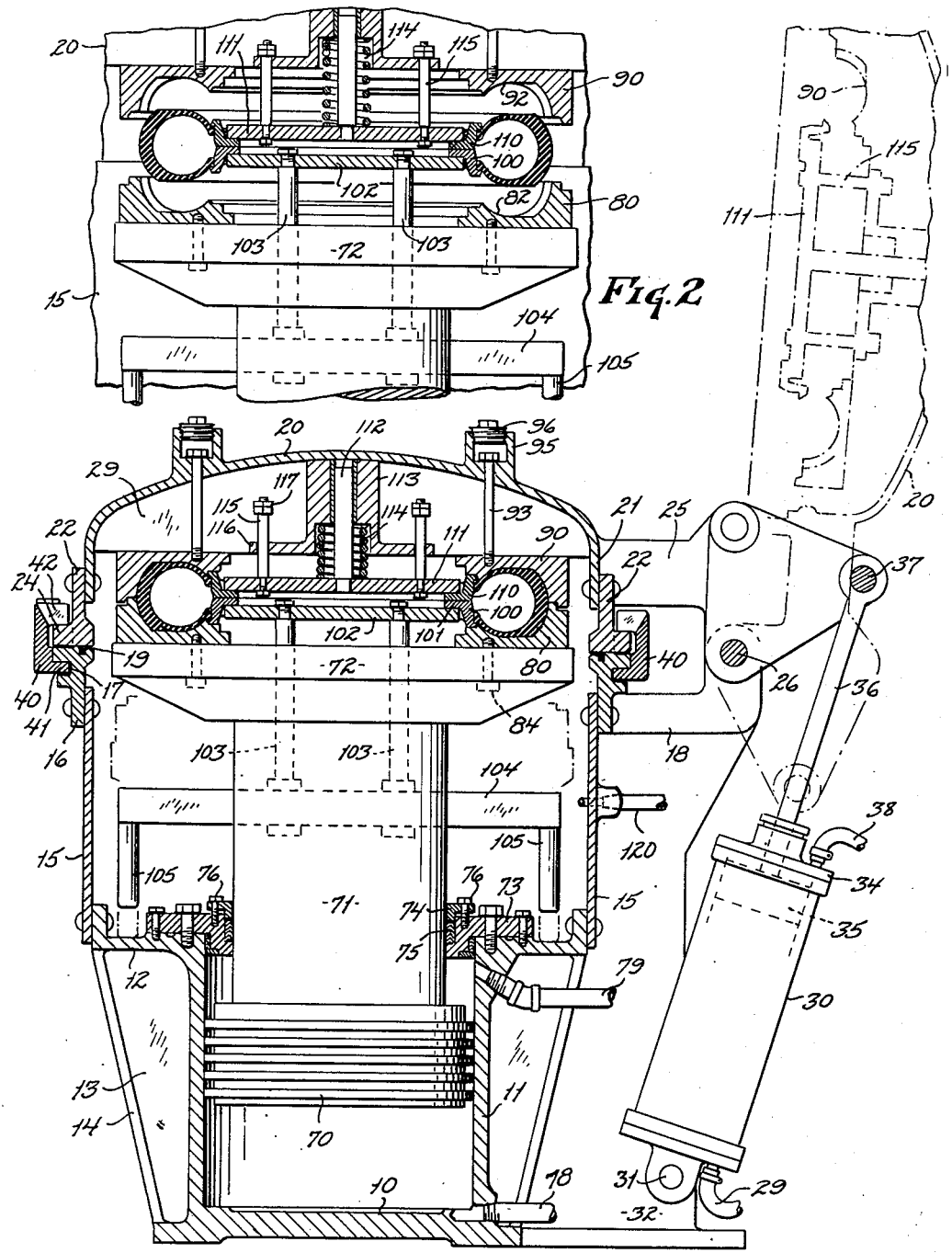

April 14, 1942. W. P. VOTH ET AL 2,279,540
VULCANIZING PRESS
Filed Feb. 28, 1939 3 Sheets-Sheet 1

INVENTORS
Walter P. Voth and
Charles B. Hudson
BY
Dale, Golrick & Teare
ATTORNEYS.

April 14, 1942.    W. P. VOTH ET AL    2,279,540
VULCANIZING PRESS
Filed Feb. 28, 1939    3 Sheets-Sheet 3

Patented Apr. 14, 1942

2,279,540

UNITED STATES PATENT OFFICE 2,279,540

VULCANIZING PRESS

Walter P. Voth and Charles B. Hudson, Akron, Ohio, assignors to Akron Standard Mold Company, Akron, Ohio, a corporation of Ohio Application February 28, 1939, Serial No. 258,984

2 Claims. (Cl. 18—17)

This invention relates to a vulcanizing press of the type having a casing adapted to be closed and receive steam and separable mold members within the casing adapted to be brought together to embrace a rubber article to be vulcanized.

An object of our invention is to provide a vulcanizing press, of such type, so constructed that the articles to be vulcanized may be readily placed in the machine, efficiently vulcanized therein, and removed therefrom. To this end, we provide a two-part casing comprising an upright hollow base member and a cap hinged to the base member, and adapted by very simple mechanism to be tipped up to make the base member accessible at the top, or be brought down to form a tight connection therewith. We secure an upper mold member to the underside of the cover, and a lower mold member mounted on a fluid-pressure elevator so that it may be raised into coaction with the upper mold member, and we provide automatically acting means within the casing for stripping the vulcanized articles from the mold members.

Our invention provides further a very efficient lock for holding the cover in steam-tight engagement with the base member, and means for automatically prying the cover up when it has become unlocked, to prevent its sticking at the gasket.

For actuating the movable mold we provide a double-acting piston in a vertical cylinder which forms part of the base member, and we arrange vertically movable stripping devices which act to hold the article independently of the molds when the article is put into the machine with the molds separated, and after it has been vulcanized, and the molds again separated.

Our machine is well adapted for vulcanizing tires, and in such case, the two mold members have annular cavities which leave the bead portion of the tire exposed inwardly beyond the mold members, and we arrange the stripping devices in the form of a pair of rings to engage such exposed bead portions of the tire and support it independently of the molds. One of these bead rings is carried by the cover, but is capable of movement independently of the mold carried by the cover. The other ring is mounted within the base member and operated by the piston, but does not partake of all of its movement, so that the lower mold member may be lowered further than the supporting ring, with the result that the lower ring may support the tire out of contact with the lower mold member.

The upper bead ring completes the bead engagement of the tire (the rest of the tire being embraced during vulcanization by the two mold members coming together), and then after the vulcanization has been completed, the lowering of the piston not only results in lowering to a less degree of the lower bead ring, but the upper bead ring is pressed down a corresponding amount by a spring, so that the vulcanized tire is supported out of contact with either mold member at the time the casing is open for removal of the tire.

Our vulcanizing press allows the vulcanizing of a single tire casing at the time. Accordingly, it is well adapted for vulcanization of special casings where there are not sufficient casings to be vulcanized at one time to use a number of molds in a tank. It requires only a comparatively small amount of steam for the vulcanization; avoids the necessity of cooling the vulcanizing device following each vulcanization, since, when once heated, the casing opened and the tire removed the next tire may be installed ready for vulcanization while the material amount of heat is retained in the mold members.

The above features and others contributing to the effectiveness of my vulcanizing press will be more apparent from the following detailed description of a preferred embodiment thereof.

Figures 3, 5:
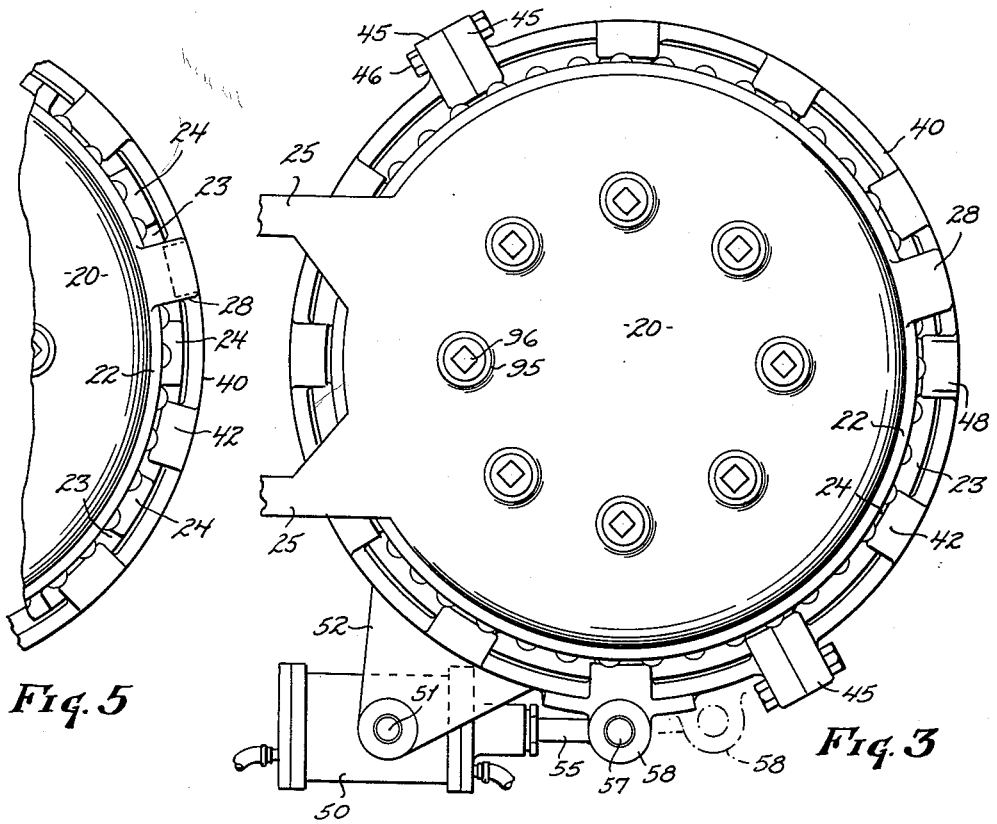
Figure 4:
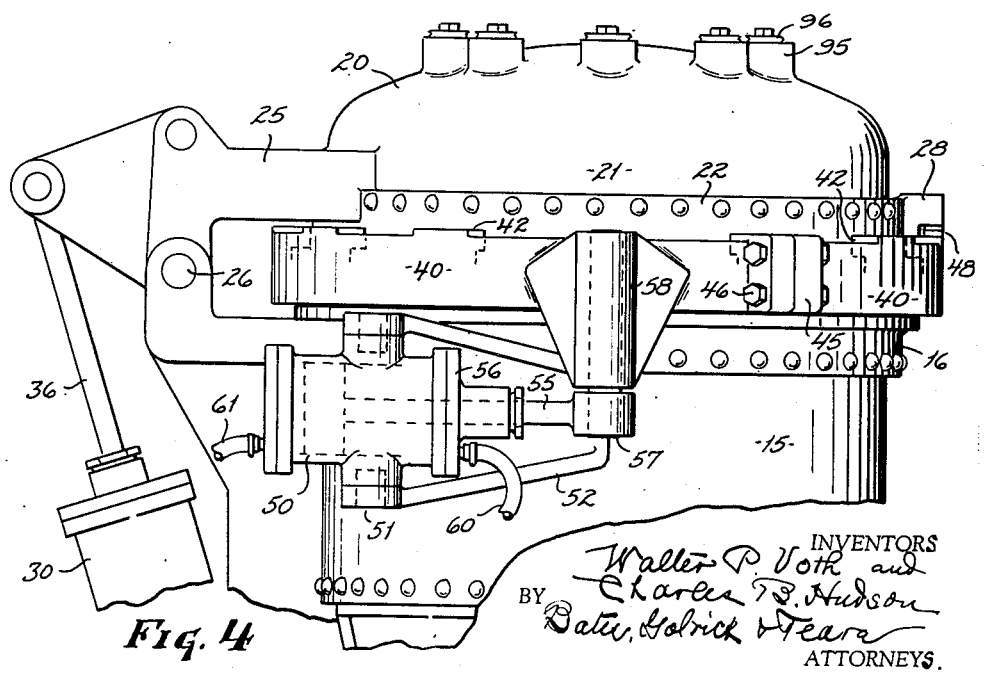
Figure 6:
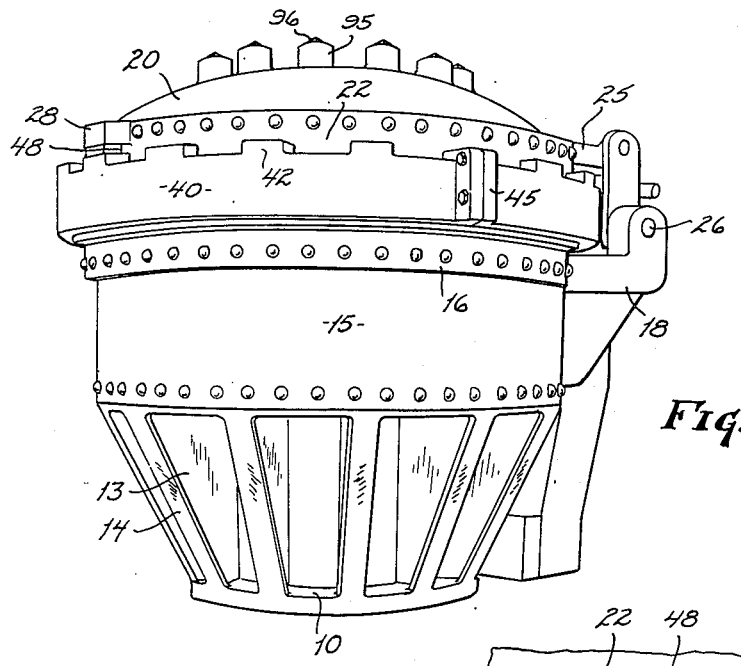
Figure 8:
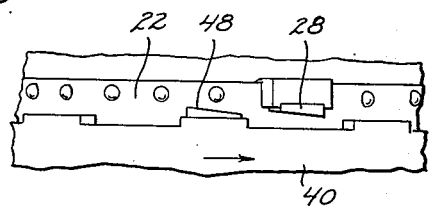
Figure 7:
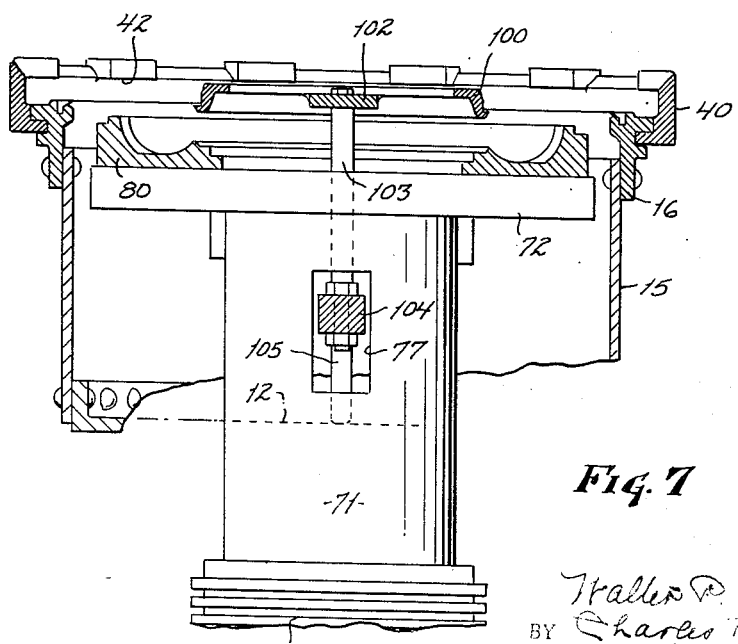

In the drawings, Fig. 1 is a vertical diametric section of the mold press showing the casing and mold members closed; Fig. 2 is a vertical section of the upper part of the apparatus with the casing closed, and the mold member separated; Fig. 3 is a plan of the apparatus with the casing closed and locked; Fig. 4 is a side elevation of the upper portion of the apparatus showing the casing locked and showing the parts in the position of Fig. 3; Fig. 5 is a horizontal view illustrating the relation of the locking ring and cover in unlocked position; Fig. 6 is an external perspective of the apparatus in unlocked position; Fig. 7 is a vertical axial section through the movable head of the press in a plane at right angles to Fig. 1; Fig. 8 is a fragmentary side elevation illustrating the locking ring and cover of the apparatus in the locked position.

As already mentioned, the casing of our vulcanizing press comprises an upright base member open at the top, and a cap member hinged to the base member and adapted to cover it. The base member as shown more particularly in Figs. 1 and 6, comprises a bottom plate 10; a cylinder wall 11 rising therefrom; an outward annular flange 12 at the top of the cylinder; upright base webs 13 with edge flanges 14 connecting the base plate, cylinder and annular flange; an upright cylindrical wall 15 secured to and rising from the outer edge of the annular flange 12, and a top reinforcing ring 16 secured to the upper end of the cylinder portion 15.

The cap member of the casing comprises a dome-like portion 20 merging into a downward flange 21 to which is secured a reinforcing ring 22. Extending from the dome 20 is an arm 25, which is pivoted on a rod 26 mounted in brackets 18 extending from the base member, with the result that the cap is hinged to the base member. Mounted in an annular recess in the top face of the base ring 16 is an annular gasket 19, which is adapted to abut the underface of the cap ring 22 when the casing is closed.

To operate the cap, we provide a cylinder 30, which is shown as pivoted at 31 to a suitable stationary bracket 32. The cylinder is closed at its upper end by a head 34, and within the cylinder is a piston 35 having a rod 36 extending through the head and pivoted at its upper end at 37 to the cap lever 25.

Fluid under pressure admitted through the pipe 38 to the top of the cylinder 30 pressing downwardly on the piston may thus pull downwardly on the free end of the lever 25 and tip the cap up into a nearly vertical position, illustrated in the broken lines in Fig. 1. Such position may be slightly beyond truly vertical, so that the action of gravity operates to maintain the cover in such upright position when once so placed.

Fluid under pressure through the pipe 29 admitting to the lower end of the casing 30 and shoving upwardly on the piston rod operates to swing the cover over onto the top of the base member of the casing bringing it down in tight arrangement therewith as shown in full lines in Fig. 1.

To lock the two members of the casing tightly together, thus enabling the proper steam pressure to be maintained within the casing, we provide a locking ring 40 which extends across the meeting place of the two casing members and is rotatively secured to the fixed member. As shown, this ring 40 has an inwardly extending annular flange 41 which occupies a corresponding outwardly facing groove 17 in the reinforcing ring 16 at the top of the base member. At its upper edge the ring 40 has a series of spaced, inwardly projecting lugs 42 which may register with corresponding notches 23 in the cap ring 22, or may extend over and engage corresponding lugs 24 formed on that ring; that is to say, the locking ring 40 and the cap ring 22 are each formed with alternately arranged lugs and notches between the lugs, after the manner of a breech lock.

When the ring 40 is in the unlocked position, as shown in Fig. 5, and the cover swung down into closed position, the lugs 24 of the cover pass through the notches between the lugs 42 of the locking ring, then a slight rotating movement of the locking ring carries its lugs 42 over the top of the lugs 24 and thus holds the cover down. The underface of the ring lugs 42 and the upper face of the cap lugs 24 are slightly bevelled in a circumferential direction so that as the ring 40 is given a rotating movement it positively cams the cover downwardly, thereby compressing the gasket 19 and making a steam-tight connection. For convenience of construction, the ring 40 is made in two semicircular parts, each part terminating in outward diametrically opposed ears 45, the two ears being clamped together by bolts 46, thus making a single ring.

To shift the locking ring arcuately to lock and unlock the cover, we provide a cylinder 50, which, as shown, has trunnions 51 mounted on a bracket 52 secured to the casing wall 15. Within the cylinder is a suitable piston having a rod 55 passing through the cylinder head 56, and pivoted at its end to a pin 57, carried by a bracket 58 secured to the ring 40.

Fluid under pressure admitted through the pipe 60 to the closed head end of the cylinder 50 forces the piston toward the left, in Fig. 4, and thereby draws the locking ring 40 into the position shown in Fig. 3, where the ring lugs 42 overhand the cap lugs 24. Finally, fluid under pressure admitted by the pipe 61 to the closed free end of the cylinder forces the piston toward the right, as indicated by the broken lines in Fig. 3, and brings the locking ring to unlocked position as shown in Fig. 5.

As there may be a tendency of the cap to stick shut, due to its tight engagement with the gasket 19, we provide means whereby the locking ring, when moved to unlocking position, positively cams the cover slightly upward to break the seal of the gasket and enable the operating cylinder and piston 30—35 to raise the cover more readily. This seal-breaking device comprises a supplemental lug 48 on the locking ring, which has an inclined top face coacting with the complementarily inclined downward face of a supplemental lug 28 on the cap ring 22. Accordingly, when the locking ring moves to the right (Figs. 3, 4 and 5) to unlock the cover, the inclined top face of the lug 48 slides under the inclined face of the lug 28 and positively cams the cover sufficiently to break the seal of the gasket. After such seal is broken, it is simple for the cylinder and piston 30—35 to swing the cover upwardly into the dotted line position in Fig. 1, without placing any undue strain on the parts.

We have referred to the upright cylinder wall 11 of the base member of the casing as constituting a portion of the general upright standard of the machine, but the inner face of that wall constitutes a cylinder having a piston operating the lower mold. Thus, as will be seen from Fig. 1, there is mounted within the cylinder 11, a piston 70, from which extends upwardly a piston rod 71 of comparatively large diameter, which carries at its top a table 72 supporting the lower mold member, as hereinafter explained.

Secured to the annular flange 12 of the fixed base is a ring 73, which, at its inner edge, closely surrounds the piston rod 71. This ring 73 carries a suitable stuffing box ring 74 which forces packing 75 against the piston rod. Adjustment of the packing may be effected by nuts 76 on studs carried by the ring 73 passing through a flange on the packing ring 74.

The piston just described is double-acting, and accordingly, fluid under pressure admitted through the pipe 78 will raise the table 72 carrying the lower mold, whereas fluid under pressure admitted through the pipe 79 will lower the piston and thus force down the mold table 72.

The two mold members 80 and 90 are, of course, formed according to the character of the article to be vulcanized. When the machine is intended for use with tires, each mold member will have an annular cavity, as 82—92 in its face, conforming to approximately half of the tire contour from the center of the tread to a position near the bead, but not quite overlapping the bead as illustrated in Figs. 1 and 2.

The lower mold member is secured to the table 72, as, for instance, by bolts 84. The upper mold member 90 is secured to the cap of the machine. As shown, the flat top of this mold rests against the flattened face of suitable webs 29 on the cover, and is held in place by bolts 93 extending through the cover. To make these bolts steam-tight, we provide on top of the cover, hollow bosses 95, having tapered internal treads into which are screwed corresponding plugs 96. When these plugs are removed, a socket wrench inserted in the boss may operate on the head of the bolt 93 to secure or release the mold as is desired.

As above mentioned, the mold cavities 82—92 do not extend quite as far as the bead of the tire casing, that is to say, the tire in the mold extends inwardly beyond the mold, as shown in Figs. 1 and 2. Coacting with these projecting beads are a pair of rings 100 and 110, each ring extending across the face of the bead and outwardly along the outer side thereof.

The ring 100 has an inwardly extending flange 101 overlapping and secured to a cross-bar 102. Secured to this cross-bar and depending from it are pins 103, which loosely occupy openings in the table 72 and piston rod 71. At their lower ends these pins are connected to a cross-bar 104, which extends through an opening 77 in the piston rod and at its ends has supporting posts 105, which may rest on the outward flange 12 of the base casing.

When the lower mold member has been lowered into position to receive the tire for vulcanization, the ring 100, which receives its support by engagement with the lower mold member 80, is lowered with that mold member, and thus the cross-bar 102, the pins 103, the cross-bar 104 and the post 105 all come down as a unit, until the lower ends of the posts abut the stationary annular flange 12. This stops the lowering movement of the ring 100, and when the continued downward movement of the plunger 70 carries the mold only downward, the mold becoming separated from the tire, as shown in Fig. 2. Accordingly, this construction enables the ring 100 to strip the tire from the lower mold member.

The upper bead ring 110 is carried by a cross-plate 111, which is guided by a central pin 112 occupying a central boss 113 in the cap. A compression spring 114 surrounds this pin and bears at its opposite ends against a shoulder on the boss and against the plate 111, and tends to lower the plate relative to the cover. The downward movement of the plate is limited by pins 115 carried thereby, and passing freely through webs 116 on the cover, and carrying stop nuts 117 at their upper ends.

When the machine is idle and ready for installing a tire for vulcanization, the cover stands up a little back of vertical position as shown in broken lines in Fig. 1; the piston 70 is substantially at the bottom of the stroke; the lower mold member 80 is thus well below the lower bead ring 100 carried by the cross-plate 102, and supported by the bar 104, so that the bead ring 100 is approximately in the plane of the open top of the casing. This enables the tire to be vulcanized to be readily slipped over the stationary ring 100 and be supported by the bead flange thereof.

Now, when the piston 35 is operated, the cover is swung down into closed position, and as it comes into that position, the upper bead ring 110 engages the upper bead of the positioned tire and the flange of the ring comes into engagement with the flange of the ring 100, the spring 114 compressing and the stop bars 115 playing back through the cover web 116. The result is that the cover and upper mold and upper bead ring come into the position shown in Fig. 1.

Now the piston in the cylinder 50 is operated in a proper direction to turn the locking ring to lock the cover tightly upon the fixed member of the casing. Then fluid is admitted to the lower portion of the cylinder beneath the piston 70, and this raises the lower mold so that it comes into the position shown in Fig. 1, the limit of the upward movement of the piston being when the faces of the two mold members outside the tire come into engagement. The upward pressure of the piston 70 maintains the parts in this position, so that the tire to be vulcanized is completely engaged by metal members on its exterior.

If desired, a suitable air bag may be placed in the tire before it is put in place on the supporting bead ring 100. Such bag by containing fluid under pressure may furnish proper internal pressure to the tire during vulcanization. Such bag would expand the tire somewhat from the condition shown in Fig. 2, but as soon as the cover is brought down to closed position, the upper half of the tire is returned, thereby to normal position, and as soon as the lower mold is raised the tire is completely embraced with pressure from the air bag sufficient for vulcanization.

The vulcanizing heat is supplied by admitting steam to the casing, as, for instance, through a pipe 120 (Fig. 1) which communicates with the interior through the wall 15. Such steam heats all the internal parts, including the molds 80 and 90, and the rings 100 and 110 engaging the tire, but also the table 72 and the cover 20, and a considerable portion of this heat is retained after the steam has been shut off and the casing vented and open for removal of the vulcanized tire. When the casing is opened, the hot cover is well out of the way, and the lower mold member is well below the tire, and it is a simple matter to remove the tire and put another tire in its place ready for vulcanization, while the metal parts remain hot. Accordingly, the time of successive vulcanizations is reduced, and there is a saving of steam.

It will be seen that our apparatus, though not bulky, has ample space for tire molds, hence these molds may be made of cast iron, and thus be considerably cheaper than the thin steel molds which are employed in multiple vulcanization where a large number of tires are vulcanized at the same time. Likewise, there is ample space at the exterior of the molds so that various existing molds may be used without the necessity of changing them to fit the casing. Notwithstanding the ample mold space referred to, the steam frame space within the casing is comparatively small, so that there is a material saving of steam over what would result if one tire, or merely a few tires, were vulcanized at one time in any of the standard large multiple-tire containers.

Our device is readily operable by the valves controlling the three pistons, 35, 51 and 70, it being understood that whenever the fluid is admitted to one end of a cylinder, the other end is vented. Also, there is a proper venting of the steam from the casing following vulcanization. Such admission and venting may, if desired, be controlled in each case by a three-way valve. If desired, in place of manual operation of these valves, they can be operated automatically by a timing device, which would evacuate the steam chamber when the vulcanization is complete, and could operate the locking cylinder and cover-shifting cylinder to open the machine.

We claim:

1. In a vulcanizing machine, a casing having a hollow upper section and a hollow cylindrical base section, a piston in the base section, a piston rod carried by the piston and extending upwardly into the upper section, an adjustable packing gland encircling said piston rod and arranged and adapted to protect the upper section from fluid pressure in the base section, said piston being arranged to divide the base section into upper and lower chambers, a cover for the upper section, a solid mold member carried by said cover, a second solid mold member in the upper section of said casing supported by said piston rod, a pair of bead rings, one carried by the cover and spring-pressed away from the corresponding mold member, and the other coacting with the second mold member and movable with it for a short distance but encountering an abutment before the piston completes the movement of the second mold member, both of said mold members being spaced from the side wall of the casing, the cover and upper section coacting to form a steam chamber which encloses the mold members, when the cover is in closed position, means to admit steam into the steam chamber and means to selectively admit fluid pressure to the upper and lower chambers of the base section of said casing, whereby one of said mold members may be moved toward and from the other mold member regardless of the presence or absence of fluid pressure in the upper section of the casing.

2. In a vulcanizing machine, a casing having a hollow cylindrical upper section and a hollow cylindrical base section of a reduced internal diameter, a piston in the base section, a piston rod carried by the piston in spaced relation to the wall of the base section, and extending upwardly into the upper section, a packing gland secured to the base section and encircling said piston rod between the piston and the upper section and arranged and adapted to protect the upper section from fluid pressure in the base section, said piston being arranged to divide the base section into upper and lower chambers, a hinged cover for the upper section, a mold member carried by said cover, a second mold member in the upper section of said casing and supported on the upper end of said piston rod, two bead rings, one resiliently carried by the cover and associated with the upper mold member and the other associated with the lower mold member and supported outside the piston, the piston being movable independently of such ring, both of said mold members being spaced from the side wall of the casing, the cover and upper section of said casing coacting to form a steam chamber which encloses the mold members when the cover is in a closed position, means to admit steam into the steam chamber and means to admit fluid pressure to the upper chamber of the base section of said casing as desired, whereby said last named mold member may be moved away from the first named mold member, while the steam is being exhausted from the upper section of the casing.

WALTER P. VOTH.
CHARLES B. HUDSON.